Patented Dec. 22, 1931

1,837,961

UNITED STATES PATENT OFFICE

RUDOLF M. HEIDENREICH, OF ELBERFELD, GERMANY, ASSIGNOR TO GENERAL ANILINE WORKS, INC., OF NEW YORK, N. Y., A CORPORATION OF DELAWARE

NEW COMPOUNDS OF THE BENZANTHRAQUINONE SERIES

No Drawing. Application filed July 30, 1928, Serial No. 296,412, and in Germany October 23, 1926.

My present invention relates to new compounds of the benzanthraquinone series, more particularly to compounds of the following general formula

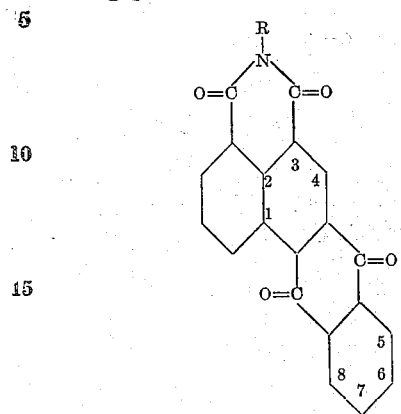

wherein R stands for hydrogen, alkyl, aralkyl or aryl. In the above indicated formula the nuclear hydrogen atoms may be substituted.

I have found that my suitably heating 1.8-naphthalimide-4-benzoyl-ortho-carboxylic acid with strong sulfuric acid it can be transformed into the corresponding benzanthraquinone compound, namely 1.2-benzanthraquinone-peri-dicarboxylic acid imide, without an essential part of the naphthalimide compound being split up with the formation of the corresponding dicarboxylic acid or dicarboxylic anhydride. This new observation shows that the formation of the benzanthraquinone ring precedes the splitting up of the naphthalimide ring and it involves the valuable technical advantage that comparatively complicated compounds of the benzanthraquinone series can be prepared by practically very simple and cheap methods.

A behaviour which is quite analogous to that 1.8-naphthalimide-4-benzoyl-ortho-carboxylic acid show the corresponding alkylimides, aralkylimides and arylimides, that is to say the reaction products of 1.8-naphthalic-anhydride-4-benzoyl-ortho-carboxylic acid and their derivatives with primary aliphatic, aliphatic-aromatic or aromatic mono-amines.

Generally speaking according to this invention products are obtained which are characterized by the following general formula:—

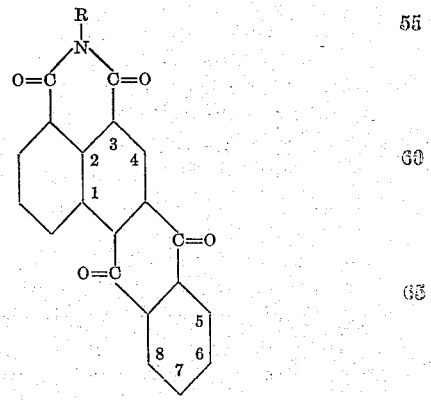

wherein R stands for hydrogen, alkyl, aralkyl or aryl. In the above indicated formula the nuclear hydrogen atoms may be substituted.

The benzanthraquinone compounds which can be prepared in the above described simple manner are valuable yellow to orange vat dyestuffs. Their shades range from yellow to orange in case the nuclear hydrogen atoms are not substituted or substituted by substituents not considerably deepening the color of anthraquinone dyestuffs, such as chlorine or bromine, whereas when introducing other substituents, such as amino groups, into the molecule dyestuffs dyeing red or even violet shades may be obtained.

The following examples are given by way of illustration, it being understood that they are in no way limitative, the parts being by weight:—

*Example 1.*—34.5 parts of 1.8-naphthalimide-4-benzoyl-ortho-carboxylic acid, prepared from 1.8-naphthalic anhydride-4-benzoyl-ortho-carboxylic acid by heating with ammonia, are introduced into about 150 parts of concentrated sulfuric acid and heated for some 10 to 15 minutes from 160° C. to 170° C. After pouring the sulfuric acid solution into a large amount of cold water the yellow precipitate is filtered, washed until neutral and the residue is extracted with dilute alkali, repeating this if necessary. There remains the beautiful yellow colored 1.2-benzanthraquinone-peri-dicarboxylic acid imide of the probable formula

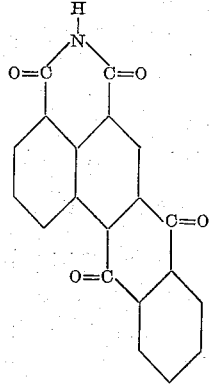

which forms a bluish green vat with alkali and hydrosulfite and can be recrystallized from high boiling organic solvents; the melting point is above 300° C.

*Example 2.*—35.9 parts of 1.8-naphthal-(N-methyl)-imide-4-benzoyl-ortho-carboxylic acid are heated for some 10 to 15 minutes from about 160° C. to 170° C. in about 150 parts of concentrated sulfuric acid; the resulting 1.2-benzanthraquinone-peri-dicarboxylic acid (N-methyl) imide is isolated and purified as described in the preceding example. It represents a yellow product which forms an olive colored vat and melts at 280° C. It has the probable constitution:—

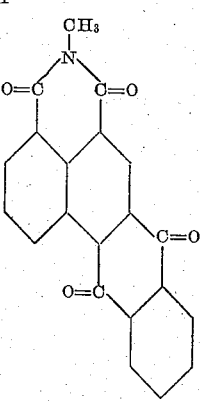

If instead of a 1.8-naphthal-(N-alkyl)-imide-4-benzoyl-ortho-carboxylic acid a 1.8-naphthal-(N-aryl)-imide-4-benzoyl-ortho-carboxylic acid is used, the corresponding 1.2-benzanthraquinone-peri-dicarboxylic acid-(N-aryl)-imides are obtainable in a similar manner, in consequence of the ring formation by means of concentrated sulfuric acid.

In a quite analogous manner the products of interaction from the derivatives of 1.8-naphthalic anhydride-4-benzoyl-ortho-carboxylic acid with ammonia, primary aliphatic, aliphatic-aromatic or aromatic monoamines can be transformed into the corresponding benzanthraquinone derivatives in strong sulfuric acid solution at elevated temperature.

In all examples the reaction temperature may vary between about 150°–200° C.

This is a continuation in part of my co-pending application Ser. No. 226,528 filed on October 15, 1927.

I claim:—

1. As new products, the compounds of the probable general formula:

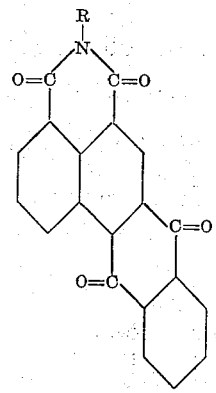

wherein R stands for hydrogen, alkyl, aralkyl or aryl, said products being yellow to orange vat dyestuffs of good fastness properties.

2. As new products, the compounds of the following general formula

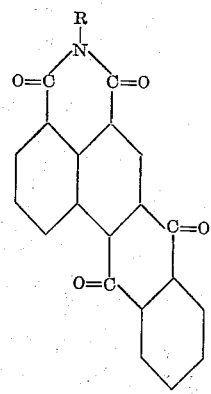

wherein R stands for hydrogen or methyl, said products being yellow to orange vat dyestuffs of valuable fastness properties.

In testimony whereof I have hereunto set my hand.

RUDOLF M. HEIDENREICH. [L. S.]